United States Patent
Ruan

(10) Patent No.: US 11,212,329 B2
(45) Date of Patent: Dec. 28, 2021

(54) METHOD, APPARATUS, DEVICE AND STORAGE MEDIUM FOR PUSHING VIDEO STREAM

(71) Applicant: Wangsu Science & Technology Co., Ltd., Shanghai (CN)

(72) Inventor: Junwei Ruan, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 17/103,928

(22) Filed: Nov. 24, 2020

(65) Prior Publication Data
US 2021/0377326 A1 Dec. 2, 2021

Related U.S. Application Data

(63) Continuation of application No. PCT/CN2020/096603, filed on Jun. 17, 2020.

(30) Foreign Application Priority Data

May 28, 2020 (CN) .......................... 202010469023.2

(51) Int. Cl.
*H04L 29/06* (2006.01)
*H04L 29/12* (2006.01)
*H04L 29/08* (2006.01)

(52) U.S. Cl.
CPC ...... *H04L 65/4084* (2013.01); *H04L 61/2007* (2013.01); *H04L 65/80* (2013.01); *H04L 67/26* (2013.01)

(58) Field of Classification Search
CPC . H04L 65/4084; H04L 61/2007; H04L 65/80; H04L 67/26; H04L 45/42
See application file for complete search history.

(56) References Cited

U.S. PATENT DOCUMENTS

2015/0244762 A1 8/2015 Clarke et al.
2016/0277282 A1* 9/2016 Chen ..................... H04L 45/122
(Continued)

FOREIGN PATENT DOCUMENTS

CN 102984279 A 3/2013
CN 106850581 A 6/2017
(Continued)

OTHER PUBLICATIONS

Wangsu Science & Technology Co., Ltd., CN First Office Action, CN202010469023.2, dated Feb. 25, 2021, 10 pgs.
(Continued)

*Primary Examiner* — Wing F Chan
*Assistant Examiner* — Billy H Ng
(74) *Attorney, Agent, or Firm* — USCH Law, PC

(57) ABSTRACT

The present disclosure relates to a method, an apparatus, a device, and a storage medium for pushing a video stream. The method includes: receiving a query request sent from a first node machine, where the first node machine generates the query request when receiving the video stream; determining a second node machine according to the query request, where the second node machine is in the same machine room as the first node machine, or, the second node machine is determined according to a result of domain name resolution on the first node machine; sending an address of the second node machine to the first node machine so that the first node machine pushes the video stream to the second node machine.

20 Claims, 3 Drawing Sheets

(56) References Cited

U.S. PATENT DOCUMENTS

| | | | |
|---|---|---|---|
| 2017/0012895 A1* | 1/2017 | Zhao | H04L 45/741 |
| 2018/0062991 A1* | 3/2018 | Nainar | H04L 45/42 |
| 2020/0028898 A1 | 1/2020 | Sherf et al. | |
| 2020/0036781 A1 | 1/2020 | Maslak | |
| 2020/0107050 A1 | 4/2020 | Peng et al. | |

FOREIGN PATENT DOCUMENTS

| | | |
|---|---|---|
| CN | 107027045 A | 8/2017 |
| CN | 107438115 A | 12/2017 |
| CN | 107911710 A | 4/2018 |
| CN | 108234827 A | 6/2018 |
| CN | 108769271 A | 11/2018 |
| CN | 108924639 A | 11/2018 |
| CN | 109040343 A | 12/2018 |
| CN | 109413229 A | 3/2019 |
| CN | 109639502 A | 4/2019 |
| CN | 109995859 A | 7/2019 |
| CN | 110213381 A | 9/2019 |
| CN | 110278229 A | 9/2019 |
| CN | 110446054 A | 11/2019 |
| CN | 110460482 A | 11/2019 |
| CN | 110535930 A | 12/2019 |
| CN | 110602270 A | 12/2019 |
| CN | 110602445 A | 12/2019 |
| CN | 110650069 A | 1/2020 |
| CN | 110677464 A | 1/2020 |
| CN | 110830604 A | 2/2020 |
| CN | 110880980 A | 3/2020 |
| CN | 111083204 A | 4/2020 |
| CN | 111726646 A | 9/2020 |

OTHER PUBLICATIONS

Wangsu Science & Technology Co., Ltd., International Search Report, PCT/CN2020/096603, dated Feb. 24, 2021, 4 pgs.

Wangsu Science & Technology Co., Ltd., Extended European Search Report, EP20803735.8, dated Aug. 16, 2021, 11 pgs.

"3rd Generation Partnership Project; Technical Specification Group Services and System Aspects; 5G enhanced mobile broadband; Media distribution (Release 15)," 3GPP Standard; Technical Specification; 3GPP TR 26.891, 3RD Generation Partnership Project (3GPP), Mobile Competence Centre; 650, Route Des Lucioles; F-06921 Sophia-Antipolis Cedex; France, vol. SA WG4, No. V1.0.0, Mar. 9, 2018, 33 pgs.

* cited by examiner

METHOD, APPARATUS, DEVICE AND STORAGE MEDIUM FOR PUSHING VIDEO STREAM

CROSS REFERENCE TO RELATED APPLICATIONS

This present application is a continuation of PCT Patent Application No. PCT/CN2020/096603, filed Jun. 17, 2020, which claims priority to Chinese Patent Application No. 202010469023.2, filed May 28, 2020, each of which is incorporated by reference herein in its entirety.

TECHNICAL FIELD

The present disclosure relates to content delivery networks and data transmission technologies, and in particular, to a method, an apparatus, a device and a storage medium for pushing a video stream.

BACKGROUND

With the development of the Internet and the growth of users, content delivery network (CDN) technology has developed rapidly.

The CDN is a new type of network content service system. Its basic idea is to avoid bottlenecks and links on the Internet that may affect the speed and stability of data transmission, so that content transmission can be faster and more stable. By placing node servers everywhere in the network to form a layer of intelligent virtual network on the basis of the existing Internet, the CDN system can redirect the user's request to the service node closest to the user in real time according to comprehensive information, such as network traffic, connections and load status of each node, a distance to users and response time, etc. Its purpose is to enable users to obtain required content nearby, solve network congestion, and improve response speed of a web site that users visit.

After entering the first year of live broadcast in 2016, the live broadcast industry has also entered a stage of rapid development. The rapid development of the live broadcast industry also puts forward higher requirements on the network content service system. As the CDN technology is relatively stable and mature so far, its supporting degree for various self-built and privatized customization needs of users in the live broadcast industry is low. In order to improve the supporting degree, on the basis of CDN, edge computing technology has been introduced.

In the live broadcast industry, the traditional solution for pushing video streams is to schedule and cover them through the CDN according to the Domain Name System (Service) Protocol (DNS). This may cause that forward of video streams from the edge computing to the CDN machine room is unable to be accurately located and may only be transmitted through a public network. The instability of the public network further affects the quality and delay of pushing video streams. Furthermore, forwarding and pushing video streams to the CDN through the public network is prone to routing detours and routing failures.

SUMMARY

The present disclosure provides a method, an apparatus, a device and a storage medium for pushing a video stream to realize that a node machine for receiving video streams preferentially selects a node machine in the same machine room to push the video streams.

To achieve the foregoing objective, an embodiment of the present disclosure provides a method for pushing a video stream, including:

receiving a query request sent from a first node machine, where the first node machine generates the query request when receiving the video stream;

determining a second node machine according to the query request, where the second node machine is in a same machine room as the first node machine, or the second node machine is determined according to a result of domain name resolution on the first node machine;

sending an address of the second node machine to the first node machine, so that the first node machine pushes the video stream to the second node machine.

On this basis, determining the second node machine according to the query request includes:

resolving the query request;

determining a machine room where the first node machine is located when the query request carries identification information of the first node machine;

determining the second node machine from the machine room.

On this basis, determining the second node machine according to the query request includes:

resolving the query request;

determining identity information of the first node machine from the query request, where the identity information indicates an ownership of the first node machine;

determining the machine room where the first node machine is located when the identity information conforms to a preset condition;

determining the second node machine from the machine room.

In some embodiments, determining the second node machine from the machine room includes:

determining performance of candidate node machines in the machine room, where the candidate node machines are other node machines except the first node machine in the machine room;

performing statistics on the performance of the candidate node machines to determine the second node machine from the candidate node machines.

In some embodiments, the performance of the candidate node machines includes at least one of the following:

network quality of the candidate node machines;
network delay of the candidate node machines;
resource information of the candidate node machines.

On this basis, the method also includes:

determining an IP address of the first node machine when the identity information does not conform to the preset condition;

determining the second node machine according to the IP address and domain name resolution rules.

In some embodiments, determining the second node machine according to the IP address and domain name resolution rules includes:

determining a geographic location of the first node machine in the content delivery network according to the IP address of the first node machine;

determining the second node machine according to the geographic location, where a distance between the second node machine and the first node machine conforms to a preset condition, and the second node machine is in a different machine room from the first node machine.

Some embodiment of the present disclosure also provides an apparatus for pushing the video stream, including:

a query request receiving module, configured to receive a query request sent from a first node machine, where the first node machine generates the query request when receiving the video stream;

a node machine determining module, configured to determine a second node machine according to the query request, where the second node machine is in the same machine room as the first node machine, or the second node machine is determined according to a result of domain name resolution on the first node machine;

an address sending module, configured to send an address of the second node machine to the first node machine, so that the first node machine pushes the video stream to the second node machine. In order to achieve the foregoing objective, another aspect of the present disclosure provides a device for pushing a video stream, including a processor and a memory. The memory is configured to store a computer program that, when executed by the processor, implements the method for pushing the video stream as in any one of the first aspect.

Some embodiments of the present disclosure provides a computer-readable storage medium on which there is stored a computer program that, when executed by a processor, implements the method for pushing a video stream as in any one of the first aspect.

It can be seen from the above that the technical solution provided by the present disclosure may determine whether to use the way to push the video stream in the same machine room or to adopt the method of domain name resolution to push the video stream according to the attribute information of the first node machine receiving the video stream. In this way, getting service closer to the end-user could come true, thereby improving the stability of pushing video streams. When the video stream is a live video stream generated in real time, the delay of forwarding and pushing video streams in the live broadcast is also reduced.

DETAILED DESCRIPTION

In order to make more clearly the objectives, technical solutions, and advantages of the present disclosure, the embodiments of the present disclosure will be described in further detail below with reference to the accompanying drawings.

A server has inherent information such as host number and IP address. When this server is set as a node in a content delivery network (CDN), it is accompanied by CDN-specific information, such as the level it is on and the geographic location it is located.

In the live broadcast industry, it is usually an anchor client who generates a video stream, and pushes the video stream to the CDN. The CDN forwards and pushes the video stream internally, and an audience client pulls the video stream from the CDN.

In order to improve the quality of pushing video streams by the anchor, pulling video streams by users, and forwarding and pushing video streams, a live broadcast platform generally deploys its own servers and edge computing methods. Then there may be public edge computing, dedicated edge computing (edge computing deployed by the live broadcast platform), public computing nodes and dedicated computing nodes (computing nodes deployed by the live broadcast platform). In theory, the live broadcast platform may optimize the interaction between the dedicated edge computing and dedicated computing nodes. When a region has a large demand for servers, multiple servers may be deployed in the region. Multiple servers are connected through a local area network, which is usually called a same machine room. The transmission speed in the same machine room is faster and more stable than that in public CDN.

However, public edge computing and public computing node is an independent product, and dedicated edge computing and dedicated computing node is an independent product. Moreover, both adopt a transparent resource scheduling scheme, that is, users cannot touch the underlying resources when using edge computing resources and CDN resources, and do not know what configuration the underlying resources using and where the machine room is. This makes it difficult to use the advantages of both at the same time. For example, public edge computing and public computing node have full coverage, while dedicated edge computing and dedicated computing node has fast transmission speed, low latency, and stable information.

Therefore, the present disclosure provides a method for pushing the video stream to realize intelligent identification of whether it is necessary to forward and push video streams in the same machine room, so as to seamlessly connect public resources with dedicated resources.

Figure 1:
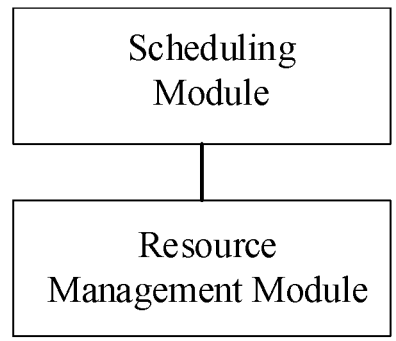
FIG. 1 is a system structure for pushing a video stream provided by the present disclosure.

FIG. 1 is a system structure for pushing a video stream provided by the present disclosure. Referring to FIG. 1, the structure includes a scheduling module and a resource management module.

The resource management module uses its own management function to mark attributes of the node machine, that is, the node attribute of the node machine as a dedicated computing node and the server attribute of the node machine as the node of the content delivery network (CDN). This may realize the horizontal management of the node machine, that is, regardless of whether the source of the video stream is public edge computing or dedicated edge computing, the transfer management may be carried out through the resource management module, and the upper business platform, especially the live broadcast platform, may seamlessly realize resource management across platforms.

The resource management module may also monitor the quality and cost of the node machines in the dedicated computing nodes, and update the health degree and availability. According to the updated health degree and availability, the node machines are divided into categories to support the provision and matching of resources at the corresponding levels according to user needs, and support priority.

Therefore, when the CDN node machine and the edge computing node machine are in the same machine room, the local area network in the machine room may be used for video stream transmission by the method for pushing the video stream in this solution, which may achieve transmission effect that is faster and more stable than that through an external network.

Figure 2:
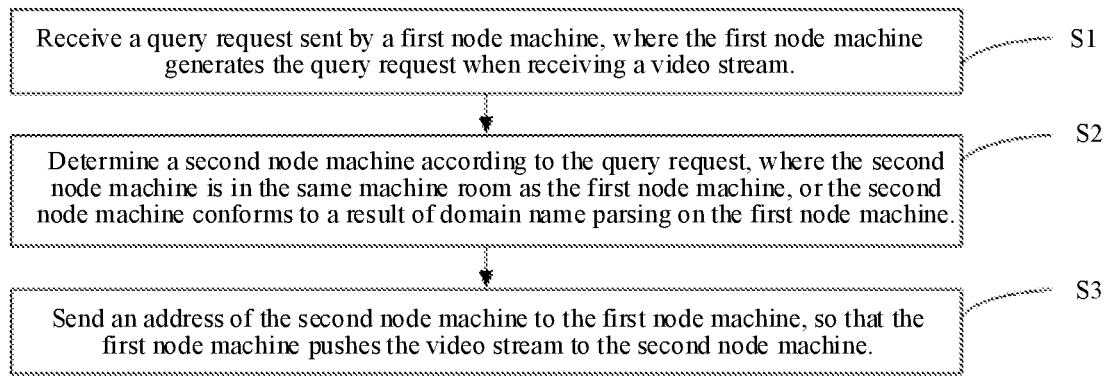
FIG. 2 is a flowchart of a method for pushing the video stream provided by an embodiment of the present disclosure.

FIG. 2 is a flowchart of a method for pushing the video stream provided by an embodiment of the present disclosure. This embodiment is applicable to a scenario where a device is also connected to a local area network while accessing the Internet. The method may be executed by the device for pushing the video stream. The device may be implemented by software and/or hardware, and is usually configured in a scheduling module in a system for pushing the video stream. Referring to FIG. 2, the method specifically includes:

in S1, a query request sent from a first node machine is received, where the first node machine generates the query request when receiving the video stream.

The node machine is generally a server which itself has inherent information such as host number and IP address. When a node machine is set as a node of the CDN, CDN-specific information will be accompanied, such as the level of the node and the geographic location of the node. When the node belongs to an edge computing node at the same time, it also has an identifier that belongs to the edge computing node. The first node machine mentioned here and the second node machine mentioned later are both node machines, and the difference in name is made for easy reference and distinction in the specification.

The node machine is associated with the anchor client. When the anchor client generates a video stream, the associated node machine receives the video stream. The node machine that receives the video stream generated from the anchor client is called the first node machine.

The node machine is associated with the scheduling module, and when receiving the video stream, the first node machine generates query information. The query information includes various information of the first node machine, such as a host number, an IP address, a located level, a located geographic location, etc.

The first node machine sends the query information to the scheduling module.

In S2, a second node machine is determined according to the query request, where the second node machine is in the same machine room as the first node machine, or the second node machine conforms to a result of domain name resolution on the first node machine (i.e., the second node machine is determined according to a result of domain name resolution on the first node machine).

The query information carries various information of the first node machine, based on the various information of the query information the scheduling module determines whether the first node machine has node machines in the same machine room. If the first node machine has node machines in the same machine room, then one node machine from the node machines in the same machine room may be selected as the second node machine. If the first node machine does not have a node machine in the same machine room, then a node machine with a close geographic location is determined from the Internet as the second node machine according to general domain name resolution rules.

Figure 3:
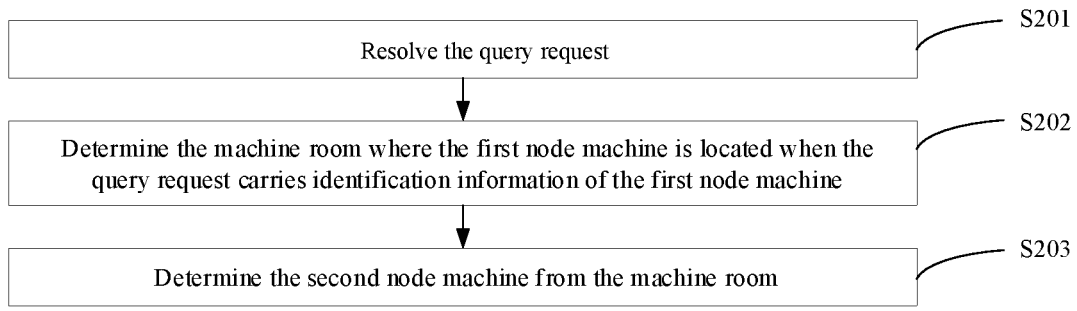
FIG. 3 is a flowchart of a method for determining a second node machine according to a query request provided by an embodiment of the present disclosure.

In a specific embodiment, as shown in FIG. 3, the second node machine may be determined according to the query request through the following steps:

in S201, the query request is resolved.

The scheduling module parses the query request, obtains the parse result and determines whether there is identification information in the parse result. The identification information is a mark that identifies whether the first node machine belongs to a certain local area network. Since the local area network is generally set by the live broadcast platform in order to optimize the processing of the video stream, there is generally an identifier set by the live broadcast platform. It may be directly determined by the identifier whether the first node machine has other node machines in the same machine room.

Specifically, an anchor client uploads a video stream through a live broadcast platform, and the video stream has an identifier of the live broadcast platform. When the first node machine receives the video stream, the query request initiated to the scheduling module carries this identifier.

In S202, the machine room where the first node machine is located is determined when the query request carries the identification information of the first node machine.

After the scheduling module finds the identification information from the parse result, the machine room where the first node machine is located is determined through the resource management module.

In S203, the second node machine is determined from the machine room.

The scheduling module determines the machine room where the first node machine is located through the resource management module, determines other node machines in the machine room, and determines one node machine from other node machines as the second node machine.

Steps S201-S203 is the processing of marking the video stream through the relationship between the client and the live broadcast platform. After finding the identifier, the scheduling module performs the operation of pushing the video stream in the same machine room, which saves the transmission time of the video stream and increases the stability of the video stream.

Figure 4:
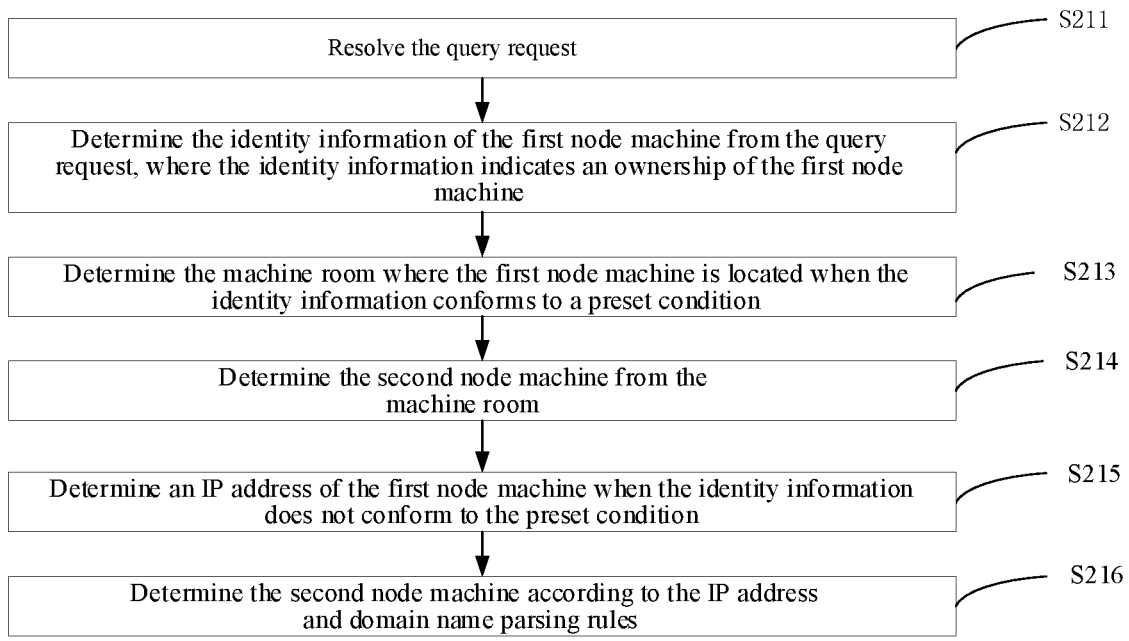
FIG. 4 is a flowchart of another method for determining the second node machine according to the query request provided by an embodiment of the present disclosure.

In a specific embodiment, as shown in FIG. 4, the second node machine may be determined according to the query request through the following steps:

in S211, the query request is resolved.

The scheduling module parses the query request and obtains the parse result. The parse result includes the identity information of the first node machine. Since the local area network is generally set by the live broadcast platform in order to optimize the processing of the video stream, it may be determined by the identity information whether the first node machine has other node machines in the same machine room available for a certain live broadcast platform.

In S212, the identity information of the first node machine is determined from the query request, where the identity information indicates an ownership of the first node machine.

The scheduling module queries the identity information of the first node machine from the parse result, and the identity information indicates the ownership of the first node machine. The first node machine may belong to a certain live broadcast platform, or may belong to an operator that provides CDN services.

In S213, the machine room where the first node machine is located is determined when the identity information conforms to a preset condition.

When the identity information of the first node machine indicates that the first node machine belongs to the live broadcast platform that deploys the machine room, the machine room where the first node machine is located is determined through the resource management module.

In S214, the second node machine is determined from the machine room.

The scheduling module determines the machine room where the first node machine is located through the resource management module, determines other node machines in the machine room, and determines one node machine from other node machines as the second node machine.

In S215, an IP address of the first node machine is determined when the identity information does not conform to the preset condition.

When the identity information of the first node machine indicates that the first node machine does not belong to the live broadcast platform that deploys the machine room, the IP address of the first node machine is directly determined from the parse result.

In S216, the second node machine is determined according to the IP address and domain name resolution rules.

Domain name resolution (DNS) is a directory of names that match numbers. In this case, the numbers are IP addresses, and computers use them to communicate with each other. DNS servers are distributed all over the world and stored on domain name servers which communicate with each other regularly to provide updates. Each designated site may correspond to multiple IP addresses.

Steps S211-S216 determines whether forwarding and pushing the video stream in the same machine room may be implemented through the relationship between the first node machine and the live broadcast platform. If possible, forwarding and pushing the video stream in the same machine room is selected preferentially, which saves the transmission time of the video stream and increases the stability of the video stream. If it is not possible, forwarding and pushing the video stream is implemented according to the domain name resolution rules. The method is compatible with two kinds of scheduling schemes for forwarding and pushing the video stream, i.e. the traditional scheduling scheme and the scheduling scheme of forwarding and pushing the video stream in the same machine room.

Figure 5:
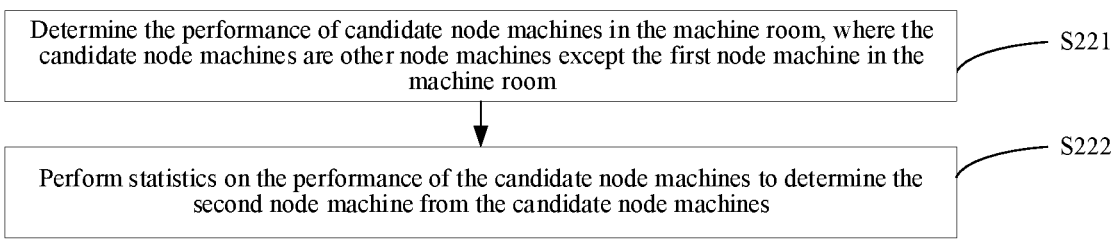
FIG. 5 is a flowchart of a method for determining the second node machine from a machine room provided by an embodiment of the present disclosure.

On the basis of the foregoing embodiment, determining the second node machine from the machine room mentioned in step S203 and step S214, referring to FIG. 5, may be performed through the following steps:

in S221, the performance of candidate node machines in the machine room is determined, where the candidate node machines are other node machines except the first node machine in the machine room.

Other node machines in the machine room except the first node machine are determined as candidate node machines, when the machine room where the first node machine is located is determined.

Generally, the performance of the candidate node machines includes at least one of the following: network quality of the candidate node machines, network delay of the candidate node machines, and resource information of the candidate node machines.

On this basis, the attribute information of the node machine may also include: status information, resource information, memory usage, and CPU status. The status information includes: hardware failure, software failure, and normal. The resource information includes: resource redundancy and resource shortage. The attributes of the node machines may be weighted, and then the node machines may be scored or sorted according to the specific conditions of each node machine.

In S222, statistics on the performance of the candidate node machines is performed to determine the second node machine from the candidate node machines.

Statistics on the performance of the candidate node machines is performed, and the node machine with the highest ranking or the highest score is selected as the second node machine.

By enriching the control levels of the scheduling module, double-layer multi-dimensional (node network quality, node network delay, server performance and other dimensions) scheduling of nodes and servers is realized to ensure the optimal quality of forwarding and pushing the video stream.

In S3, the address of the second node machine is sent to the first node machine, so that the first node machine pushes the video stream to the second node machine.

After determining the address of the second node machine, the scheduling module sends the address to the first node machine in a preset format. The first node machine receives the address and pushes the video stream to the address.

Figure 6:
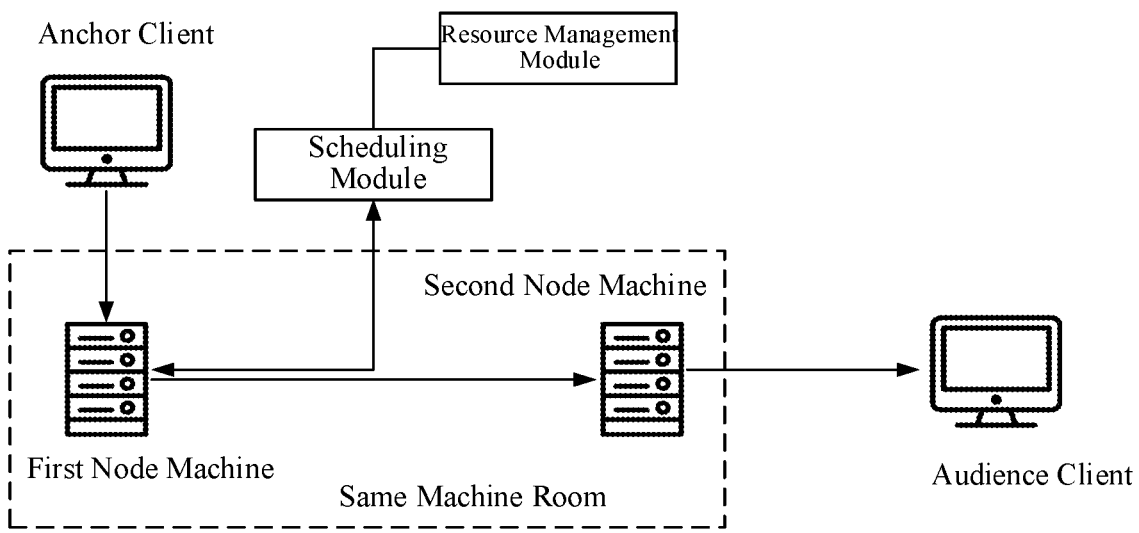
FIG. 6 is a schematic diagram of pushing the video stream in the same machine room provided by an embodiment of the present disclosure.

FIG. 6 is a schematic diagram of pushing a video stream in the same machine room according to an embodiment of the present disclosure. Referring to FIG. 6, how to push the video stream in the same machine room is described. The anchor generates the video stream on the anchor client. The anchor client defines a private protocol, which is generally customized based on RTMP (Real Time Messaging Protocol), mainly for some optimizations on transmission. The anchor client pushes the video stream to the first node machine through the private protocol. After receiving the video stream, the first node machine sends query information to the scheduling module. The query information carries various information of the first node machine. Associated with the resource management module, the scheduling module determines the second node machine in the same machine room as the first node machine according to the query information and the information in the resource management module. That is, the first node machine initiates a query to the scheduling module to obtain the IP address of the second node machine in the same machine room as the first node machine. The scheduling module returns the IP address of the second node machine according to the preset format. After receiving the IP address, the first node machine pushes the video stream to the second node machine pointed to by the IP address. The client pulls the video stream from the second node machine to realize the transmission of the entire video stream.

In this embodiment, according to the attribute information of the first node machine that receives the video stream, it is determined whether to use the way to push the video stream in the same machine room or to adopt the method of domain name resolution to push the video stream. In this way, getting service closer to the end-user could come true, thereby improving the stability of pushing the video stream. When the video stream is a live video stream generated in real time, the delay of forwarding and pushing the video stream in the live broadcast is also reduced.

Figure 7:
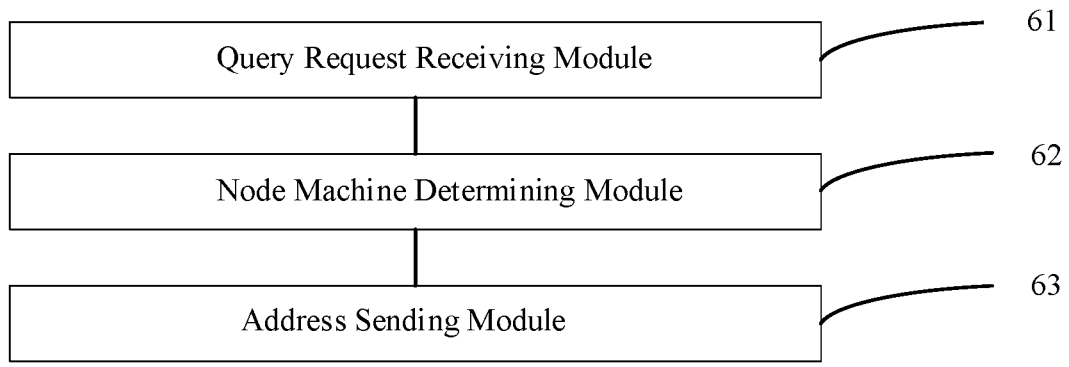
FIG. 7 is a schematic structural diagram of an apparatus for pushing the video stream provided by another embodiment of the present disclosure.

FIG. 7 is a schematic structural diagram of an apparatus for pushing a video stream provided by another embodiment of the present disclosure. The apparatus includes: a query request receiving module 61, a node machine determining module 62, and an address sending module 63. Among them:

the query request receiving module 61 is configured to receive a query request sent from a first node machine, where the first node machine generates the query request when receiving the video stream;

the node machine determining module 62 is configured to determine a second node machine according to the query request, where the second node machine is in the same machine room as the first node machine, or the second node machine is determined according to a result of domain name resolution on the first node machine;

the address sending module 63 is configured to send an address of the second node machine to the first node machine, so that the first node machine pushes the video stream to the second node machine.

The technical solution provided in the present disclosure may determine whether to use the way to push the video stream in the same machine room or to adopt the method of domain name resolution to push the video stream according to the attribute information of the first node machine receiving the video stream. In this way, getting service closer to the end-user could come true, thereby improving the stability of pushing the video stream. When the video stream is a live video stream generated in real time, the delay of forwarding and pushing the video stream in live broadcast is also reduced.

On this basis, the node machine determining module 62 includes:

a first request resolution sub-module, configured to parse the query request;

an identification information determining sub-module, configured to determine the machine room where the first node machine is located when the query request carries identification information of the first node machine;

a second node machine determining sub-module, configured to determine the second node machine from the machine room.

On this basis, the node machine determining module 62 includes:

a second request resolution sub-module, configured to parse the query request;

a first identity information determining sub-module, configured to determine the identity information of the first node machine from the query request, where the identity information indicates an ownership of the first node machine;

a first identity information execution sub-module, configured to determine the machine room where the first node machine is located when the identity information conforms to a preset condition;

a second node machine determining sub-module, configured to determine the second node machine from the machine room.

On this basis, the second node machine determining sub-module includes:

a performance determining unit, configured to determine the performance of candidate node machines in the machine room, where the candidate node machines are other node machines except the first node machine in the machine room;

a node machine determining unit, configured to perform statistics on the performance of the candidate node machines to determine the second node machine from the candidate node machines.

On this basis, the performance of the candidate node machines includes at least one of the following:

network quality of the candidate node machines;
network delay of the candidate node machines;
resource information of the candidate node machines.

On this basis, the node machine determining module 62 includes:

a second identity information determining sub-module, configured to determine an IP address of the first node machine when the identity information does not conform to the preset condition;

a second identity information execution sub-module, configured to determine the second node machine according to the IP address and domain name resolution rules.

On this basis, the second identity information execution sub-module includes:

a geographic location determining unit, configured to determine the geographic location of the first node machine in the content delivery network according to the IP address of the first node machine;

a node machine determining unit, configured to determine the second node machine according to the geographic location, where a distance between the second node machine and the first node machine conforms to a preset condition, and the second node machine is in a different machine room from the first node machine.

The above-mentioned apparatus may execute the method provided in any embodiment of the present disclosure, and has corresponding functional modules and beneficial effects for executing the method.

Figure 8:
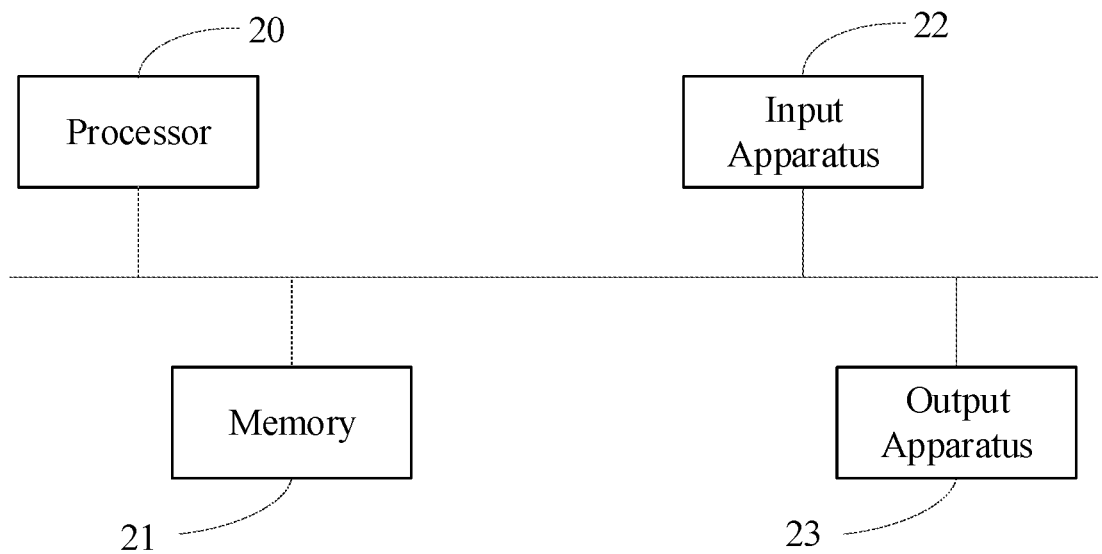
FIG. 8 is a schematic structural diagram of a device for pushing the video stream provided by another embodiment of the present disclosure.

FIG. 8 is a schematic structural diagram of a device for pushing a video stream according to another embodiment of the present disclosure. As shown in FIG. 8, the device for pushing a video stream includes a processor 20, a memory 21, an input apparatus 22 and an output apparatus 23. The number of the processor 20 in the device for pushing the video stream may be one or more. One processor 20 is taken as an example in FIG. 8. The number of the memory 21 in the device for pushing the video stream may be one or more. One memory 21 is taken as an example in FIG. 7. The processor 20, the memory 21, the input apparatus 22 and the output apparatus 23 of the device for pushing the video stream may be connected by a bus or in other ways. In FIG. 8, a bus connection is taken as an example. The device for pushing the video stream may be a computer, a server, etc.

As a computer-readable storage medium, the memory 21 may be used to store software programs, computer-executable programs, and modules, such as program instructions/modules corresponding to the method for pushing the video stream in any embodiment of the present disclosure (for example, the query request receiving module 61, the node machine determining module 62 and the address sending module 63 in the device for pushing the video stream). The memory 21 may mainly include a program storage area and a data storage area. The program storage area may store an operating system and an application program required by at least one function; the data storage area may store data created according to the use of the device, etc. In addition, the memory 21 may include a high-speed random access memory, and may also include a non-volatile memory, such as at least one magnetic disk storage device, a flash memory device, or other non-volatile solid-state storage devices. In some examples, the memory 21 may further include a memory remotely provided with respect to the processor 20, and these remote memories may be connected to the device through a network. Examples of the aforementioned networks include, but are not limited to, the Internet, corporate intranets, local area networks, mobile communication networks, and combinations thereof.

The input apparatus 22 may be used to receive input digital or character information, and to generate key signal input related to the audience/user settings and function control of the device that pushes the video stream, and may also be a camera for acquiring images and a sound pickup equipment for acquiring audio data. The output apparatus 23 may include an audio equipment such as a speaker. It should be noted that the specific composition of the input apparatus 22 and the output apparatus 23 may be set according to actual conditions.

The processor 20 executes various functional applications and data processing of the device by running software programs, instructions, and modules stored in the memory 21, that is, implements the aforementioned method of pushing the video stream.

The embodiment of the present disclosure also provides a storage medium containing computer-executable instructions that, when executed by a computer processor, implement the method for pushing a video stream. The method includes:

receiving a query request sent from a first node machine, and the first node machine generates the query request when receiving the video stream;

determining a second node machine according to the query request, where the second node machine is in the same machine room as the first node machine, or the second node machine is determined according to a result of domain name resolution on the first node machine;

sending an address of the second node machine to the first node machine, so that the first node machine pushes the video stream to the second node machine.

Alternatively, for the storage medium containing computer-executable instructions provided by the embodiment of the present disclosure, the computer-executable instructions are not limited to the method operations of pushing the video stream as described above, may also perform the related operations of the methods for pushing the video stream provided by any embodiment of the present disclosure, and have corresponding functions and beneficial effects.

Through the above description of the embodiments, those skilled in the art may clearly understand that the present disclosure may be implemented by software and necessary general-purpose hardware. Alternatively, the present disclosure may also be implemented by hardware, but in many cases the former is a better embodiment. Based on such understanding, the technical solutions of the present disclosure essentially, or in other words, a part thereof contributing to the existing technology can be embodied in the form of a software product stored in a computer-readable storage medium, such as a computer floppy disk, read-only memory (ROM), random access memory (RAM), flash memory (FLASH), hard disk or optical disk, etc., and which includes several instructions to make a computer device (which may be a robot, a personal computer, a server, or a network device, etc.) execute the method for pushing the video stream described in any embodiment of the present disclosure.

It is worth noting that the various units and modules included in the above device for pushing the video stream are only divided by functional logic, but not limited to the above division, as long as the corresponding functions may be realized; in addition, the specific names of each function units are only for the convenience of distinguishing each other, and are not intended to limit the protection scope of the present disclosure.

It should be understood that each part of the present disclosure may be implemented by hardware, software, firmware, or a combination thereof. In the above-mentioned embodiments, multiple steps or methods may be implemented by software or firmware stored in a memory and executed by a suitable instruction execution system. For example, if implemented by hardware, as in another embodiment, multiple steps or methods may be implemented by any one or a combination of the following technologies known in the art: a discrete logic circuit having logic gate circuits for implementing logic functions upon data signals, an application-specific integrated circuit having suitable combinational logic gate circuits, programmable gate array (PGA), and field programmable gate array (FPGA), etc.

In the description of this specification, the description with reference to the terms "in an embodiment", "in another embodiment", "exemplary" or "in a specific embodiment" etc. means to combine the embodiment or the specific features, structures, materials, or characteristics described in the examples are included in at least one embodiment or example of the present disclosure. In this specification, the schematic representation of the above-mentioned terms does not necessarily refer to the same embodiment or example. Moreover, the described specific features, structures, materials or characteristics may be combined in any one or more embodiments or examples in a suitable manner.

Although the present disclosure has been described in detail in terms of general description, specific examples and experiments, some modifications or improvements can be made on the basis thereof, which is obvious to those skilled in the art. Therefore, these modifications or improvements made without departing from the spirit of the present disclosure belong to the protection scope claimed by the present disclosure.

What is claimed is:

1. A method for pushing a video stream, comprising:
   receiving a query request sent from a first node machine, wherein the first node machine generates the query request when receiving the video stream;
   determining a second node machine according to the query request, wherein the second node machine is in a same machine room as the first node machine, or the second node machine is determined according to a result of domain name resolution on the first node machine;
   sending an address of the second node machine to the first node machine, so that the first node machine pushes the video stream to the second node machine.

2. The method according to claim 1, wherein determining the second node machine according to the query request comprises:
   resolving the query request;
   determining the machine room where the first node machine is located when the query request carries identification information of the first node machine;
   determining the second node machine from the machine room.

3. The method according to claim 1, wherein determining the second node machine according to the query request comprises:
   resolving the query request;
   determining identity information of the first node machine from the query request, wherein the identity information indicates an ownership of the first node machine;
   determining the machine room where the first node machine is located when the identity information conforms to a preset condition;
   determining the second node machine from the machine room.

4. The method according to claim 2 or 3, wherein determining the second node machine from the machine room comprises:
determining performance of candidate node machines in the machine room, wherein the candidate node machines are other node machines except the first node machine in the machine room;
performing statistics on the performance of the candidate node machines to determine the second node machine from the candidate node machines.

5. The method according to claim 4, wherein the performance of the candidate node machines comprises at least one of the following:
network quality of the candidate node machines;
network delay of the candidate node machines;
resource information of the candidate node machines.

6. The method according to claim 3, further comprising:
determining an IP address of the first node machine when the identity information does not conform to the preset condition;
determining the second node machine according to the IP address of the first node machine and a domain name resolution rule.

7. The method according to claim 6, wherein determining the second node machine according to the IP address of the first node machine and the domain name resolution rule comprises:
determining a geographic location of the first node machine in the content delivery network according to the IP address of the first node machine;
determining the second node machine according to the geographic location, wherein a distance between the second node machine and the first node machine conforms to a preset condition, and the second node machine is in a different machine room from the first node machine.

8. The method according to claim 1, wherein, the first node machine is a node machine that is associated with an anchor client and that is configured to receive the video stream generated from the anchor client.

9. The method according to claim 1, wherein, the first node machine is configured to generate query information when receiving the video stream; and
wherein, the query information comprises at least one of the following information of the first node machine: a host number, an IP address, a located level, a located geographic location.

10. The method according to claim 9, further comprising:
determining whether the first node machine has node machines in the same machine room according to the query information;
selecting one node machine from the node machines in the same machine room as the second node machine, if the first node machine has node machines in the same machine room;
determining a node machine with a close geographic location from an Internet as the second node machine according to general domain name resolution rules, if the first node machine does not have a node machine in the same machine room.

11. The method according to claim 2, wherein, the identification information is a mark that identifies whether the first node machine belongs to a certain local area network, for determining whether the first node machine has other node machines in the same machine room.

12. The method according to claim 4, further comprising:
performing statistics on the performance of the candidate node machines, and
selecting the node machine with the highest ranking or the highest score as the second node machine.

13. A device for pushing a video stream, comprising a processor and a memory, wherein the memory is configured to store a computer program that, when executed by the processor, implements a method for pushing the video stream comprising:
receiving a query request sent from a first node machine, wherein the first node machine generates the query request when receiving the video stream;
determining a second node machine according to the query request, wherein the second node machine is in a same machine room as the first node machine, or the second node machine is determined according to a result of domain name resolution on the first node machine;
sending an address of the second node machine to the first node machine, so that the first node machine pushes the video stream to the second node machine.

14. The device according to claim 13, wherein determining the second node machine according to the query request comprises:
resolving the query request;
determining the machine room where the first node machine is located when the query request carries identification information of the first node machine;
determining the second node machine from the machine room.

15. The device according to claim 13, wherein determining the second node machine according to the query request comprises:
resolving the query request;
determining identity information of the first node machine from the query request, wherein the identity information indicates an ownership of the first node machine;
determining the machine room where the first node machine is located when the identity information conforms to a preset condition;
determining the second node machine from the machine room.

16. The device according to claim 14 or 15, wherein determining the second node machine from the machine room comprises:
determining performance of candidate node machines in the machine room, wherein the candidate node machines are other node machines except the first node machine in the machine room;
performing statistics on the performance of the candidate node machines to determine the second node machine from the candidate node machines.

17. The device according to claim 16, wherein the performance of the candidate node machines comprises at least one of the following:
network quality of the candidate node machines;
network delay of the candidate node machines;
resource information of the candidate node machines.

18. The device according to claim 15, further comprising:
determining an IP address of the first node machine when the identity information does not conform to the preset condition;
determining the second node machine according to the IP address of the first node machine and a domain name resolution rule.

19. The device according to claim 18, wherein determining the second node machine according to the IP address of the first node machine and the domain name resolution rule comprises:
- determining a geographic location of the first node machine in the content delivery network according to the IP address of the first node machine;
- determining the second node machine according to the geographic location, wherein a distance between the second node machine and the first node machine conforms to a preset condition, and the second node machine is in a different machine room from the first node machine.

20. A non-transitory computer-readable storage medium, storing a computer program that, when executed by a processor, implements a method for pushing a video stream comprising:
- receiving a query request sent from a first node machine, wherein the first node machine generates the query request when receiving the video stream;
- determining a second node machine according to the query request, wherein the second node machine is in a same machine room as the first node machine, or the second node machine is determined according to a result of domain name resolution on the first node machine;
- sending an address of the second node machine to the first node machine, so that the first node machine pushes the video stream to the second node machine.

\* \* \* \* \*